June 17, 1958　　　A. J. MATLEN　　　2,839,409
APPARATUS AND PROCESS FOR PREPARING MEAT
Filed Feb. 2, 1951　　　　　　　　　　　　3 Sheets-Sheet 1

Abraham J. Matlen
INVENTOR.

BY *[signature]*
Attorneys

June 17, 1958  A. J. MATLEN  2,839,409
APPARATUS AND PROCESS FOR PREPARING MEAT
Filed Feb. 2, 1951  3 Sheets-Sheet 2

Abraham J. Matlen
INVENTOR.

BY *[signature]*
Attorneys

June 17, 1958  A. J. MATLEN  2,839,409
APPARATUS AND PROCESS FOR PREPARING MEAT
Filed Feb. 2, 1951  3 Sheets-Sheet 3

Abraham J. Matlen
INVENTOR.

BY *Clarence A. O'Brien*
*and Harvey B. Jacobson*
Attorneys

United States Patent Office 2,839,409
Patented June 17, 1958

2,839,409

APPARATUS AND PROCESS FOR PREPARING MEAT

Abraham J. Matlen, Detroit, Mich.

Application February 2, 1951, Serial No. 209,117

2 Claims. (Cl. 99—107)

This invention relates to a process and a machine for preparing and flavoring foods, and more particularly to a process and apparatus for preparing cooked meats.

The invention will be described with particular reference to the preparation of pork meats, but it is to be understood that the method and machine of the invention are adapted for cooking, roasting or broiling and basting of other meats, such as beef, fowl, fish, etc.

Briefly, the method of preparing meats in accordance with the invention comprises two steps or stages, the first step or stage being designed to subject the meat to a baking or preliminary or pre-heat treatment under controlled atmospheric conditions so that on demand the meat can be finish-cooked to order, and in a relatively short time. In this first stage, the meat is kept at a desired temperature and under a controlled atmosphere for an indeterminate length of time, depending upon the particular kind of meat being processed and the demand for it to be finish-cooked and served. The atmosphere is produced by suitable flavor-generating mechanism, such as in the case of "smoked meat" by the use of a smoke generating means disposed in an oven in which the meat is being treated during the first stage.

In the second stage of the process, the meat is finish-cooked by transferring it from the pre-heating or pre-baking treatment oven, wherein the meat is maintained at a relatively low baking temperature and while protected from the surrounding atmosphere, to a broiler where the meat is subjected to a fairly high temperature and the same is finish-broiled rapidly to the desired state. In such a process, the natural flavors, as well as those imparted thereto by the atmosphere in which the meat is pre-baked, are retained and uniformly distributed therethrough. Further, during the pre-baking stage, the temperature and atmosphere are controlled so that the meat is prevented from absorbing undesirable substances or condensing vapors which adversely affect the flavor of the meat. In addition, the atmosphere in which the meat is pre-baked is preferably charged with a substance which preserves as well as flavors the meat.

It is an object of the invention to provide a method of preparing broiled meats in a minimum of time and to order, and wherein the meat exhibits its maximum appetizing flavor and aroma, and retains the natural juices, as well as providing a broiled meat having a very pleasing color.

Another object of the invention is to provide a process and machine for preparing foods for the table in accordance with a "cook to order" requirement, and particularly with respect to meats which are subjected to a pre-heating or low baking treatment prior to finish-cooking whereby the meat is made very delectable and with a minimum loss of weight.

Another object of the invention is to provide an improved method for processing meats, particularly pork products, so that such meat can be finish-cooked for eating in a much shorter time than has been heretofore considered possible, and wherein the color and taste of the meat is improved over conventional cooking methods.

Another object of the invention envisions a method and machine for preparing evenly smoked and flavored pork meats, especially spare ribs of pork, and which is rendered tender and succulent, and wherein the color of the smoked meat is most pleasing and uniform.

Still another object and advantage of the invention comprises a method of processing meat wherein the same is delivered from a refrigerating atmosphere directly into a low temperature baking oven where the meat is subjected to a baking treatment below the cooking temperature of the meat prior to broiling the same.

A still further object of the invention is to provide an improved method for barbecuing pork meat, particularly spare ribs, wherein the meat is made tender and succulent and more readily digestible, the natural juices being retained and a less greasy or oily barbecued meat provided.

These, together with various ancillary objects, features and advantages of the invention, which will later become apparent as the following description proceeds, are attained by the present invention, a preferred embodiment thereof being illustrated, by way of example only, in the accompanying drawings, wherein.

Figure 1:
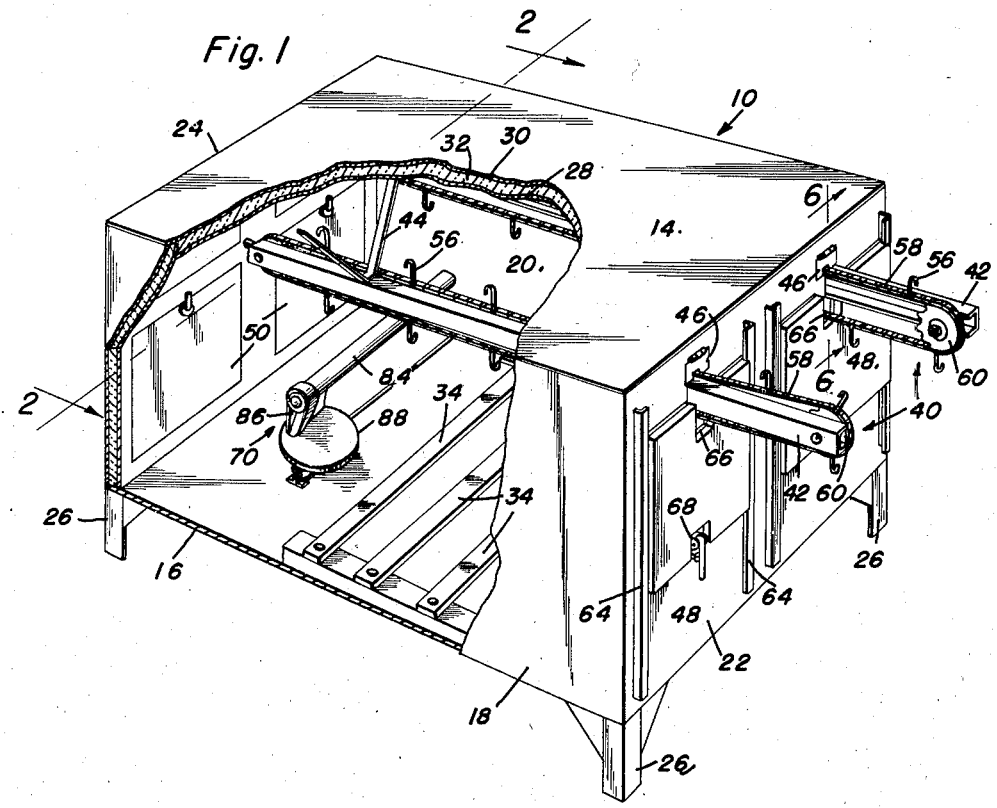
Figure 1 is a perspective view of a pre-baking and flavoring oven constructed in accordance with this invention.

Referring to the drawings in more detail and wherein like reference characters indicate like parts throughout the several views, the numeral 10 designates generally a pre-baking oven constructed in accordance with this invention, and which comprises a rectangular-shaped oven having a top 14, bottom 16, sides 18 and 20, and end portions 22 and 24, the oven being supported on leg members 26 positioned at the corners, as shown in Figure 1. To provide a suitably insulated structure, the oven walls comprise spaced inner and outer members 28 and 30, respectively, which walls are preferably made of sheet metal such as steel or aluminum, and the space therebetween being filled with insulating material, for example, glass wool, as at 32.

The oven 10 is heated by conventional electrical strip resistance members 34 which are disposed in the bottom of the oven and electrically connected to a suitable source of electricity through the bus bar 36 and interconnecting electrical conductors 38. For supporting and positioning meat to be pre-baked prior to broiling or cooking, endless conveyor members, generally indicated at 40, are provided. As illustrated in Figure 1, a pair of conveyors are utilized, but it will be understood that, depending on the size of the oven, additional conveyor means may be provided. Further, while for large commercial oven units meat conveyors are usually employed for convenience in handling the meat, such conveyors may be omitted, since the temperature in the oven is relatively low and, accordingly, the meat may be placed in and removed from the oven by hand, if desired. The conveyors in the embodiment shown comprise spaced U-shaped channel members 42 which are suspended from the top of the oven by V-shaped bracket members 44, the channel members 42 being extended outwardly and through the end wall 22 of the oven, through an opening 46 in the wall and disposed immediately above a sliding door 48. The openings 46 above the conveyors 40 are provided with door flaps 47 which are hinged at the top, as at 49, and arranged to close the opening provided above the conveyors for accommodating the hook 56.

Figure 2:
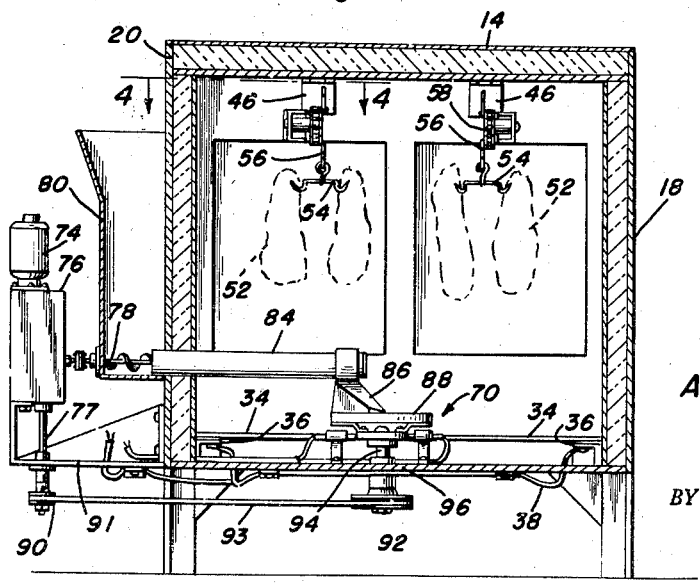
Figure 2 is a vertical sectional view of the pre-baking oven shown in Figure 1 and taken on the line 2—2 of that figure, looking in the direction of the arrows.
Figure 6:
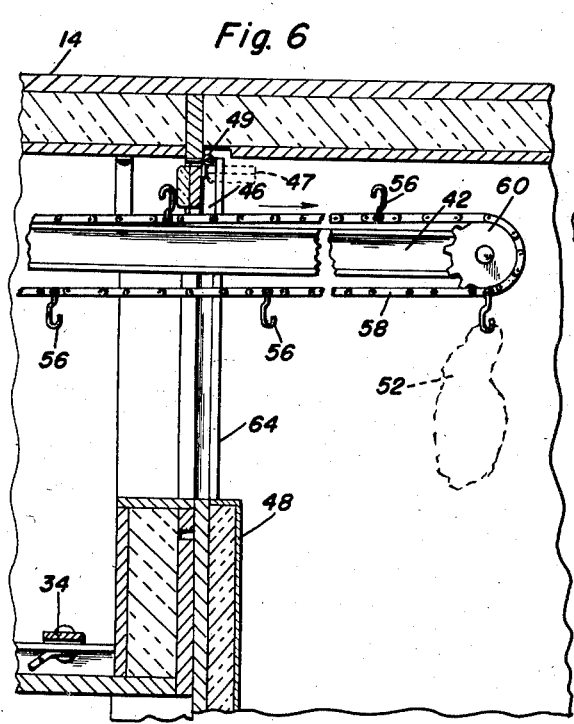
Figure 6 is a fragmentary view in section and taken on the line 6—6 of Figure 1 and looking in the direction of the arrows.
Figure 4:
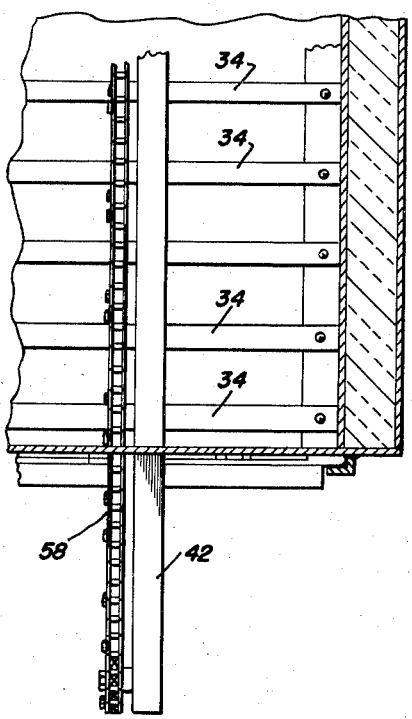
Figure 4 is a fragmentary detail plan view in section of a portion of the pre-baking oven, shown partly broken away, and taken substantially on the line 4—4 of Figure 2.
Figure 7:
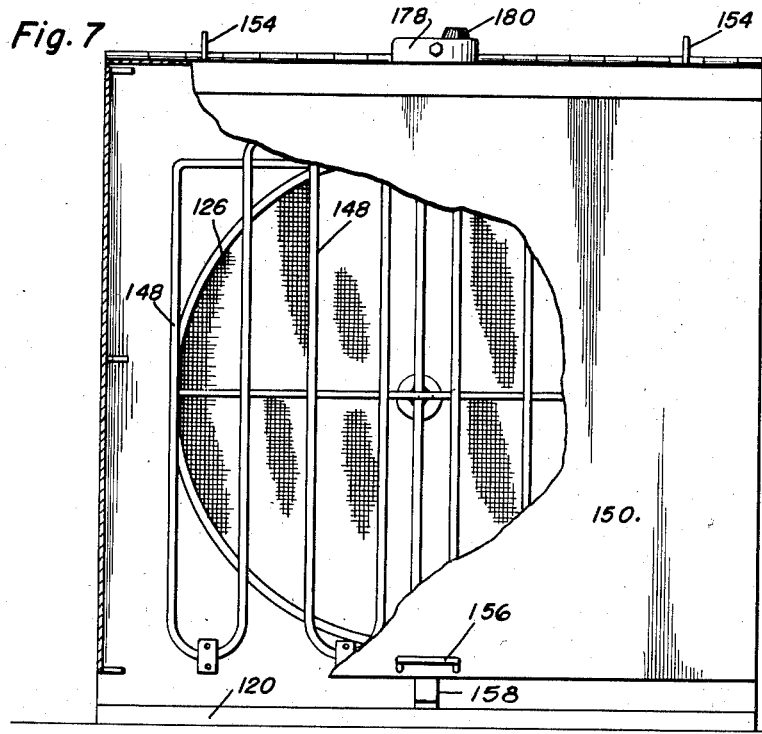
Figure 7 is an end elevational view of the broiler illustrated in Figure 8, and being shown partly broken away to show the construction and arrangement of the parts more clearly.

As indicated in Figure 6, the outer ends of the conveyor members 42 which extend from the oven 10 are enclosed in a chamber which is insulated from the surrounding atmosphere and may be suitably refrigerated so that the meat can be transferred to the conveyors without coming in direct contact with the surrounding atmosphere immediately prior to being advanced into the pre-baking oven. In this way, condensation of moisture onto the meat and its absorption thereof is prevented. A rotary rack, not shown, may also be used to circumvent the conveyor, if desired. The opposite ends of the channel members 42 terminate short of the wall 24 of the oven and above the respective doors 50 in the end wall 24 of the oven. Meat portions, such as indicated at 52 in dotted lines on Figure 2, are suitably supported on hook means 54 which in turn is supported on the hook 56 fastened to the endless chain member 58, the endless chain conveyor being disposed over sprocket means 60 suitably journaled at the ends of the channels 42.

The endless conveyor members 58 are suitably operated by grasping the hooks 56 and moving the chain therealong, and the meat suspended on the hooks enters through the sliding doors 48 into the oven where it is allowed to remain the necessary length of time while it acquires its full flavor prior to being broiled. After being subjected to the pre-baking and flavoring treatment in the oven, the meat is removed through the doors 50.

The doors 48 are arranged to slide vertically in the guides 64 positioned at opposite sides thereof and the doors are provided with a notched portion 66 at the top thereof for accommodating the conveyor channel member 42. For fastening the doors in their upward or closed positions, the same are provided with latches 68.

To provide for the introduction of a flavoring material, such as hickory smoke, or the like, and which is absorbed by the meat during the pre-baking treatment, a flavor-generating atmosphere means such as indicated at 70 is arranged for operation in the oven. The generator, as illustrated more in detail in Figures 2 and 3, comprises a motor 74 which is operatively connected through a speed reducer gearing 76 to a screw feed shaft 78 which is positioned in the bottom of a hopper 80 arranged on the rear side wall 20 of the oven and which is adapted to contain the atmosphere generating material, for example, hickory wood sawdust, or a mixture of pulverized sawdust and flavoring substances. The screw feed shaft 78 operates to move the pulverized dust and flavoring matter from the hopper 80 into the tube or duct 84 from whence it is discharged therefrom through a chute 86 and onto a heated and rotating grid 88 which forms a smoke ring.

The smoke grid 88 is suitably rotated by means of a pulley wheel 90 mounted on a shaft 77 which in turn is operatively connected through the speed reducer gearing 76 to the motor 74, the motor 74 driving simultaneously the screw shafts 78 and 77. The motor 74 and speed reducer 76 and pulley 90 are suitably supported on a bracket 91 which is attached to the wall 20 of the oven. The pulley 90 is operatively connected to a pulley wheel 92 by means of a belt 93, which is preferably a V-belt, or chain and sprocket assembly, the pulley 92 being suitably keyed to the vertically disposed stub shaft 94, which shaft is suitably journaled in the bottom wall of the oven as at 96, and the shaft 94 is attached at its upper end to the base of the grid 88. Thus, operation of the motor 74 for feeding the pulverized wood dust and flavoring material into the feed tube 84 simultaneously operates the drive pulley 90 which, in turn rotates the grid 88.

Figure 3:
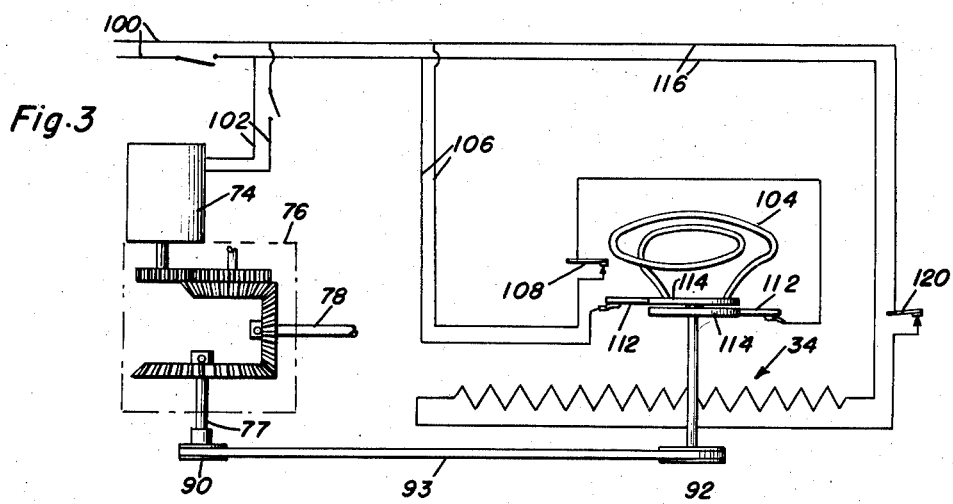
Figure 3 is a diagrammatical view illustrating an arrangement for rotating the heating unit of the flavoring mechanism in response to the flavoring material conveyor.
Figure 5:
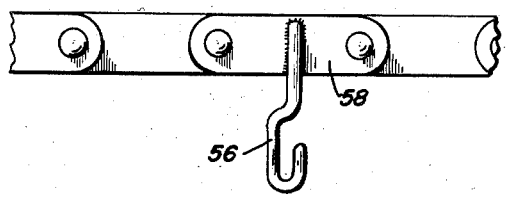
Figure 5 is an enlarged fragmentary view of a portion of the conveyor chain and showing the method of positioning the meat hook thereon.

As schematically illustrated in Figure 3, electric current is suitably supplied from a power source connected to the line 100, and the motor 74 is connected thereto through a switch-controlled line 102. Similarly, a heating element 104 on the grid member 88 is electrically connected through a line 106 and thermostat 108 to the power line 100. Opposite sides of the lines 106 are connected to the rotatable heating element 104 by means of brushes 112 and slip rings 114. The heating resistance bars schematically illustrated at 34 for supplying heat to the oven are connected in parallel to the power source through the lines 116. A thermostat 120 is provided for regulating the temperature and cutting on and off of the electric current supplied to the resistors 34.

The particular rotational speed of the grid member 88 and rate of feeding the combination of wood dust and flavoring substances varies with different flavor atmosphere-generating mixtures. For example, by regulating the temperature of the grid ring 88 and the rate of supplying the flavoring substance thereto, the critical atmospheric conditions in the oven can be maintained for any particular mixture of flavoring substances.

Figure 8:
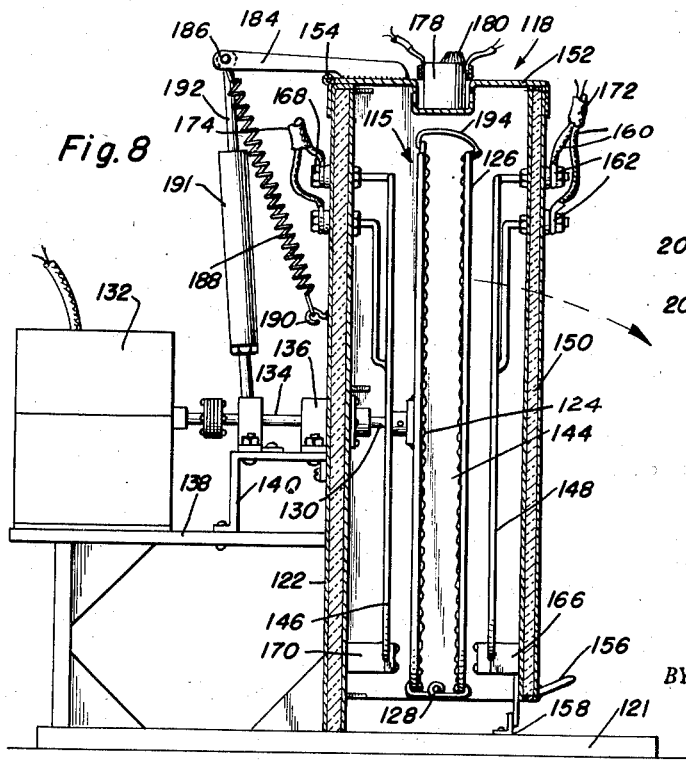
Figure 8 is a vertical sectional view through the broiler of this invention.

When the meat is to be served, it is removed from the pre-baking and flavoring oven 10 through the doors 50 and immediately placed into a wire basting ring 115 of a broiling unit shown generally at 118 of Figure 8. This broiling unit comprises a base supporting member 121 with an upstanding insulated wall 122 which is rigidly supported on said base. The basting ring 115 of the broiling unit consists of two disks of wire mesh 124 and 126, the front disk 126 being suitably hinged at the bottom, as at 128, which suitably fastens the bottom portion of the wire disks together, whereby the outer disk member can be swung outwardly and downwardly to load and unload the broiler. The rear disk 124 is suitably fixed to a shaft 130 which is arranged to be rotated by the motor 132 which is drivingly connected to the shaft 134 and through a speed reducer 136 to thus drive the shaft 130 slowly. Motor 132 and associated shaft and driving connection to the broiler grid shaft 130 are suitably attached to the wall 122 of the broiler by a mounting plate 138 and a bracket 140. Rotation of the shaft 130 causes the basting ring 115 to rotate slowly so that the juices released from the meat by the broiling heat flows in all directions over the surface of the meat, such as indicated at 144, covering it completely, thereby properly basting the meat.

The broiling heat is provided for by two electrically heated resistor elements 146 and 148 arranged closely adjacent to the wire grid members 124 and 126 of the basting ring 115. The front heating element 148 is mounted on the front wall 150, the wall being suspended from the top member 152, which in turn is hingedly secured, as at 154, to the rigid wall 122. By this construction of the broiler, the front wall 150 and top portion 152 can be swung upwardly about the hinge 154 so as to provide for access to the broiler basting ring 115. To assist in raising the front wall 150, a handle 156 is provided near the bottom of the wall, and a stop member 158 is positioned on the base 120 for suitably positioning the wall relative to the basting ring 115.

Electrical connection is made to the heating element 148 through the wall 150 by suitable electrical conductor means 160, the heating element 148 being rigidly supported on the wall by means of the terminal members 162 and insulating member 166. Similarly, the heating element 146 is attached to the back wall 122 by means of the terminal members 168 and resistor element 170. Electrical conduit means 172 and 174 are suitably fastened to the terminal members 162 and 168, respectively, the current supplied thereto being regulated through a thermostat 178 which is suitably set at the desired temperature by means of a knob 180.

For providing suitable means for assisting in opening and closing the broiler unit, a lever 184 is suitably fastened to the cover 152, and pivotally attached at its outer end, as at 186, is a coil tension spring 188, which is suitably fastened at its lower end to a hook 190 secured to the wall 122. This coil spring 188 is placed under tension and assists in swinging the front wall member 150 and attached electrical heating elements thereabout the hinged portion 154 so as to permit access to the basting ring 115. To cushion the upward swing of the broiling unit on release of the front wall 150 to bring about opening of the broiler, a dashpot 191 is provided which is suitably pivoted at its upper end to the arm member 184, as at 186. The dashpot 191 is of the conventional cylinder and piston type construction, the outer end of the piston rod 192 being attached at its upper end to the lever 184, as at 186.

Figure 9:
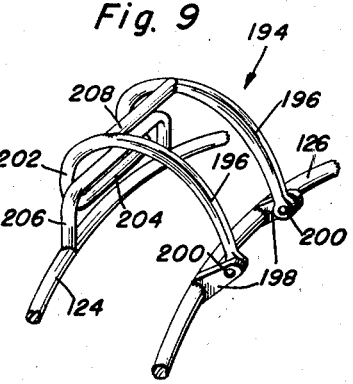
Figure 9 is a detail view of the latching mechanism of the broiler gridiron, the parts of the gridiron being shown broken away.

For suitably fastening the basting disks 124 and 126 together at their top portion, a clamping ring 194 is provided as shown in Figure 9. This clamping ring member comprises an arcuate U-shaped wire member 196, which is hingedly attached to the front disk ring 126 by means of the brackets 198, the ends of the U-shaped ring 196 being suitably pivoted thereto as by means of the pins 200. At the opposite end of the U-shaped arcuate wire 196, the looped forward portion is curved under and backward as at 202 so as to provide a flanged portion 204. This flange 204 is adapted to yieldably engage over the U-shaped upstanding loop member 206 suitably positioned on the rear disk wire member 124. To assist in prying open the arcuate U-shaped flange 204 and thereby opening the broiler grids for loading and unloading the same with meat, a transverse wire length 208 is secured between the wires 196, as shown in Figure 9.

In operating the machine for carrying out the process, the insulated, thermostatically controlled oven 10 is heated to maintain uniformly low temperatures, preferably below 300° F. and by utilizing the conveyors, meat can be continuously or intermittently placed in the oven and removed therefrom after the meat has been heated and pre-baked for the desired time. By virtue of the conveyor system, the meat can be placed on the hooks as provided while the same is on the outside of the oven, as in a refrigerated compartment adjacent thereto, and the meat conveyed through the oven opening and removed therefrom in the proper sequence, as desired. By suspending and spacing the meat on the conveyor, the maximum amount of surface of the meat is exposed to the controlled atmosphere in the oven. The oven is sealed so that the interior of the same can be properly controlled as regards its temperature and atmosphere conditions, and by generating the desired flavoring substances, such as by burning powdered hickory dust and the like therein, the desired flavor is imparted to the meat during this pre-baking treatment.

In the use of the flavoring atmosphere generator of the machine, it is possible to produce any desired flavored atmosphere which is absorbed in the meat. This is accomplished by automatically feeding a desired amount of an atmosphere-forming mixture, e. g., a mixture of hard wood and/or other flavoring substances, onto the thermostatically controlled heating grid surface so that rapid distillation and combustion of the mixture is effected to produce the desired flavoring atmosphere for absorption by the meat.

It is an important feature of the invention, when preparing smoked meats, for example, to operate the machine so as to feed the flavor-producing substance such as hard wood dust or wood particles mixed with spices, e. g., cloves, at a properly controlled rate onto the thermostatically regulated heating surface of the grid surface of the generator. The temperature of the surface of the grid is accurately controlled by the setting of the thermostat 108 so as to produce a flavoring atmosphere of substantially constant consistency. Thus, by varying the temperature of the heating element of the generator and the amount of the flavoring substance conveyed thereon, the atmosphere of the oven can be controlled so as to release a fairly constant volume of the flavor-producing substance or particles in the atmosphere of the oven for bringing about the best flavoring conditions for the particular meat being prepared.

After the meat has been pre-baked in the oven and the desired flavor imparted thereto, the meat is then removed from the oven and placed in the broiler unit, the same being placed between the grid members 124 and 126, as heretofore described, and the meat subjected to a broiling radiant heat while the grid members are rotated as a unit. It will be understood that the broiler grid members may be heated by other means than electrical, if desired. Rotation of the broiler grids between which the meat is retained permits both sides of the meat to be broiled simultaneously. The broiling heat, when applied to pre-baked meat, particularly spare ribs or pork which has been treated at a low temperature in the pre-baking oven, makes it possible to barbecue pork meat in a time as short as four minutes. Thus, the invention provides an improved method of processing or barbecuing pork meats, and the like, in a much shorter time than heretofore considered possible, and with the production of a more palatable and appetizing meat.

The meat to be processed in accordance with this invention is preferably sprinkled with paprika or other spices before being placed in the pre-baking oven. This is conveniently done in the refrigerating compartment while the meat portion is suspended on the conveyor as shown in Figure 6. Treatment of the meat with peppers and spices, such as cloves, etc. is also preferably done while the meat is in the pre-baking oven.

It is important that the meat not be allowed to remain for any length of time in an atmosphere and at a temperature which will bring about condensation of a moisture layer onto the meat as this has a detrimental effect on the flavor of the meat and otherwise lowers the efficiency of the process. Preferably, the meat is moved directly from a refrigerating compartment into the pre-baking oven and the atmosphere to which the meat is subjected is suitably controlled at all times so that no condensation of moisture onto the meat is allowed to take place.

In preparing barecued meats, such as pork, steaks, etc. in accordance with the improved process of this invention, the meat is heated in the pre-baking oven at a temperature between about 135° F. to 225° F. for not less than 45 minutes and preferably for from one to four hours, and when the meat is retained in the pre-baking oven for longer periods, the temperature is correspondingly reduced below 135° F. and on down to room temperature, e. g., 70 to 72° F. In general, the longer the time of pre-baking, the lower the temperature used during such pre-baking treatment. If the meat has been allowed to cool below 135° F. in the oven, it is reheated to 135° F. and preferably up to about 170° F. in the pre-baking oven prior to removing the same for broiling or finish-cooking treatment.

The process permits the baking and salvaging of previously treated meats from the day before, or longer periods, while pre-baking fresh meat, inasmuch as the temperature is maintained below the natural cooking temperature of the meat during such pre-baking treatment and thus the meat can be treated for an indefinite length of time in the pre-baking oven. The thermostat 120, which controls the oven temperature, is set to operate so as to maintain a relatively constant, even temperature in the oven, to thereby prevent the formation of turbulent air currents which result in an uneven pre-baking treatment of the meat and which is, of course, undesirable.

The thermostat 108, which controls the temperature of the smoke generator heating element 104 is suitably set to maintain a temperature of approximately 675° F. (plus or minus 15°) where hickory wood saw-dust is used to form the flavoring atmosphere. Other hardwoods may be employed, as desired, which do not contain turpentine, rosin or gums which detrimentally affect the flavor of the meat. A large part of the heat in the oven is supplied by the flavoring atmosphere generator, the vapors and flavoring particles being readily carried upwardly in contact with the meat. During the subsequent broiling or barbecuing treatment, the meat is retained in a vertical plane and rotated between closely spaced radiant heating elements. The meat is thus subjected to an intense broiling heat treatment for from four to ten minutes, depending upon the time and temperature of pre-baking to which the meat has been subjected, to produce a finish-cooked meat ready to serve.

As numerous modifications and substitutions of the apparatus and method of treating meats in accordance with the present invention will readily occur to those skilled in the art after a consideration of the foregoing specification and accompanying drawings, it is not intended to limit the invention to the precise apparatus and method as shown and described, but all suitable modifications and equivalents thereof may be resorted to which fall within the scope of the appended claims.

Having described the invention, what is claimed as new is:

1. The method of preparing meat for serving which comprises maintaining said meats under refrigeration, preparing an atmosphere charged with flavoring material, said atmosphere being maintained at a temperature of the order of 135° F. to 225° F., transferring the meat from refrigeration to said flavoring atmosphere, maintaining an atmosphere about said meat which inhibits condensation of moisture on the surface of said meat during the transfer to said flavoring atmosphere, said meat being retained in said flavoring atmosphere for a period of the order of one to four hours, removing said meat from said flavoring atmosphere and subjecting said meat to a broiling temperature for a period of the order of four to ten minutes.

2. In barbecuing apparatus, a broiler comprising a base, an upstanding insulated wall on said base, a shaft extending through said insulating wall, means for rotating said shaft, a basting ring mounted on said shaft, said basting ring including a front and back disk of wire mesh, hinge means securing said disks adjacent the edge thereof, a clamp member in opposed relation to said hinge, a top member hingedly mounted on said upstanding wall, a front wall fixed in depending relation on said top member, resistor type heating units mounted on said upstanding wall and on said front wall, said units extending into closely spaced relation with said basting ring, a control lever fixed on said top member, a spring attached to said lever for urging said lever to swing said top and said front wall to open position, and a dash pot for cushioning the operation of said lever.

References Cited in the file of this patent

UNITED STATES PATENTS

| | | |
|---|---|---|
| 652,531 | Carlson | June 26, 1900 |
| 1,361,183 | Reed | Dec. 7, 1920 |
| 1,444,945 | Bogusky | Feb. 13, 1923 |
| 2,009,634 | Purpura | July 30, 1935 |
| 2,072,364 | Gray et al. | Mar. 2, 1937 |
| 2,092,226 | Simons | Sept. 7, 1937 |
| 2,199,584 | Bemis | May 7, 1940 |
| 2,266,131 | Thou | Dec. 16, 1941 |
| 2,318,050 | Boynton | May 4, 1943 |
| 2,366,169 | Barth | Jan. 2, 1945 |
| 2,400,640 | Hanson et al. | May 21, 1946 |
| 2,485,890 | Keljik | Oct. 25, 1949 |
| 2,505,973 | Julian | May 2, 1950 |
| 2,507,486 | Weissenbach | May 9, 1950 |
| 2,545,818 | Larkin | Mar. 20, 1951 |
| 2,673,156 | Minder | Mar. 23, 1954 |

OTHER REFERENCES

"Culinary Arts Institute Encyclopedic Cook Book," 1948 by Ruth Berolzheimer, published by Culinary Arts Institute, Chicago, page 384, article entitled Barbecued Spare Ribs.